(12) United States Patent
Njemanze et al.

(10) Patent No.: US 8,560,679 B2
(45) Date of Patent: *Oct. 15, 2013

(54) METHOD AND APPARATUS FOR EXERCISING AND DEBUGGING CORRELATIONS FOR NETWORK SYSTEM

(75) Inventors: Hugh S. Njemanze, Los Altos, CA (US); Debabrata Dash, Sunnyvale, CA (US); Shijie Wang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 356 days.

This patent is subject to a terminal disclaimer.

(21) Appl. No.: 13/031,079

(22) Filed: Feb. 18, 2011

(65) Prior Publication Data

US 2011/0145711 A1     Jun. 16, 2011

Related U.S. Application Data

(63) Continuation of application No. 10/308,416, filed on Dec. 2, 2002, now Pat. No. 7,899,901.

(51) Int. Cl.
*G06F 15/173*     (2006.01)
*G06F 9/00*       (2006.01)
*G06F 11/00*      (2006.01)

(52) U.S. Cl.
USPC ............... 709/224; 709/223; 726/14; 726/22; 714/39

(58) Field of Classification Search
USPC ................... 709/223, 224; 726/14, 22; 714/39
See application file for complete search history.

(56) References Cited

U.S. PATENT DOCUMENTS

| | | | | |
|---|---|---|---|---|
| 5,557,742 | A * | 9/1996 | Smaha et al. | 726/22 |
| 6,134,664 | A * | 10/2000 | Walker | 726/22 |
| 6,347,374 | B1 * | 2/2002 | Drake et al. | 726/1 |
| 6,453,345 | B2 * | 9/2002 | Trcka et al. | 709/224 |
| 6,839,850 | B1 * | 1/2005 | Campbell et al. | 726/23 |
| 2002/0178383 | A1 * | 11/2002 | Hrabik et al. | 713/201 |

* cited by examiner

*Primary Examiner* — Ranodhi Serrao

(57) ABSTRACT

A selected time interval of previously stored events generated by a number of computer network devices are replayed and cross-correlated according to rules. Meta-events are generated when the events satisfy conditions associated with one or more of the rules. The rules used during replay may differ from prior rules used at a time when the events occurred within a computer network that included the computer network devices. In this way, new rules can be tested against true event data streams to determine whether or not the rules should be used in a live environment (i.e., the efficacy of the rules can be tested and/or debugged against actual event data).

20 Claims, 3 Drawing Sheets

METHOD AND APPARATUS FOR EXERCISING AND DEBUGGING CORRELATIONS FOR NETWORK SYSTEM

RELATED APPLICATIONS

This application claims the benefit under 35 U.S.C. §120 as a continuation of U.S. patent application Ser. No. 10/308,416, entitled "Method And Apparatus For Exercising And Debugging Correlations For Network Security System", filed Dec. 2, 2002, now U.S. Pat. No. 7,899,901 which is incorporated by reference herein in its entirety. This application is related to and hereby incorporates by reference U.S. patent application Ser. No. 10/308,415, entitled "Real Time Monitoring and Analysis of Events from Multiple Network Security Devices", filed Dec. 2, 2002 (U.S. Pat. No. 7,376,969).

FIELD OF THE INVENTION

The present invention relates to a computer-based system for replaying previously stored events concerning a computer network in order to test the efficacy of correlation rules applied to the events.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, intrusion detection systems (IDS) have been developed to help uncover attempts by unauthorized persons and/or devices to gain access to computer networks and the information stored therein. In addition, network devices such as routers and firewalls maintain activity logs that can be used to examine such attempts.

Intrusion detection may be regarded as the art of detecting inappropriate, incorrect or anomalous activity within or concerning a computer network or system. The most common approaches to intrusion detection are statistical anomaly detection and pattern-matching detection. IDS that operate on a host to detect malicious activity on that host are called host-based IDS (and may exist in the form of host wrappers/personal firewalls or agent-based software), and those that operate on network data flows are called network-based IDS. Host-based intrusion detection involves loading software on the system (the host) to be monitored and using log files and/or the host's auditing agents as sources of data. In contrast, a network-based intrusion detection system monitors the traffic on its network segment and uses that traffic as a data source. Packets captured by the network interface cards are considered to be of interest if they match a signature.

Regardless of the data source, there are two complementary approaches to detecting intrusions: knowledge-based approaches and behavior-based approaches. Almost all IDS tools in use today are knowledge-based. Knowledge-based intrusion detection techniques involve comparing the captured data to information regarding known techniques to exploit vulnerabilities. When a match is detected, an alarm is triggered. Behavior-based intrusion detection techniques, on the other hand, attempt to spot intrusions by observing deviations from normal or expected behaviors of the system or the users (models of which are extracted from reference information collected by various means). When a suspected deviation is observed, an alarm is generated.

Advantages of the knowledge-based approaches are that they have the potential for very low false alarm rates, and the contextual analysis proposed by the intrusion detection system is detailed, making it easier for a security officer using such an intrusion detection system to take preventive or corrective action. Drawbacks include the difficulty in gathering the required information on the known attacks and keeping it up to date with new vulnerabilities and environments.

Advantages of behavior-based approaches are that they can detect attempts to exploit new and unforeseen vulnerabilities. They are also less dependent on system specifics. However, the high false alarm rate is generally cited as a significant drawback of these techniques and because behaviors can change over time, the incidence of such false alarms can increase.

Regardless of whether a host-based or a network-based implementation is adopted and whether that implementation is knowledge-based or behavior-based, an intrusion detection system is only as useful as its ability to discriminate between normal system usage and true intrusions (accompanied by appropriate alerts). If intrusions can be detected and the appropriate personnel notified in a prompt fashion, measures can be taken to avoid compromises to the protected system. Otherwise such safeguarding cannot be provided. Accordingly, what is needed is a system that can provide accurate and timely intrusion detection and alert generation so as to effectively combat attempts to compromise a computer network or system.

SUMMARY OF THE INVENTION

In one embodiment, the present invention provides for replaying, from a computer readable storage device and in response to user selection, a selected time interval of previously stored events generated by a number of computer network devices. These replayed events can be displayed in several modes. One mode allows for "normal time" in which the replay is performed as if the events were playing out in real time. Alternatively, the replay can be accelerated to play fluster than normal, for a quick review of the events, or even to play "instantaneously," if one only wants to review the results of correlation operations.

During replay, the previously stored events may be cross-correlated according to rules defining incidents. Meta-events are generated when the events satisfy conditions associated with one or more of the rules. In some cases, the rules used during replay differ from prior rules used at a time when the events occurred within a computer network that included the computer network devices. In this way, new rules can be tested against true event data streams to determine whether or not the rules should be used in a live environment (i.e., the efficacy of the rules can be tested against actual event data). When generated, the meta-events can be displayed. In some embodiments, even previously generated meta-events (i.e., those that were generated at a time the events actually occurred within the computer network) can be displayed. For example, such previously generated meta-events can be replayed from the same (or a different) computer readable storage device.

Prior to being stored in the computer-readable storage device, the events may be gathered from one or more of routers, e-mail logs, anti-virus products, firewalls, network intrusion detection systems, access control servers, virtual private network systems, network device event logs and network device Syslogs. Subsequent to being gathered, and prior to being stored, the events are preferably normalized to a common event schema. This may be done using software agents associated with one or more of the computer network devices, and in some cases, the events may be replayed via these software agents.

The user selection described above may be made through a graphical computer interface having virtual buttons defining modes of replay, such as "play," "fast forward" and "reverse." The user selection may be made through the graphical user interface, for example using a pick list and/or by selecting a time window of events for replay.

A further embodiment provides for replaying, from a computer readable storage device, one or more previously stored events generated by a number of computer network devices, and cross-correlating the events according to rules defining incidents, wherein the rules used during replay differ from prior rules used at a time when the events occurred within a computer network that included the computer network devices. Meta-events may be generated and displayed when, during replay, the events satisfy conditions associated with one or more of the rules. If so desired, one or more of the rules used during replay that produced meta-events may be subsequently applied to live events reported by one or more of the computer network devices.

BRIEF DESCRIPTION OF THE DRAWINGS

The present invention is illustrated by way of example, and not limitation, in the figures of the accompanying drawings in which.

DETAILED DESCRIPTION

Figure 1:
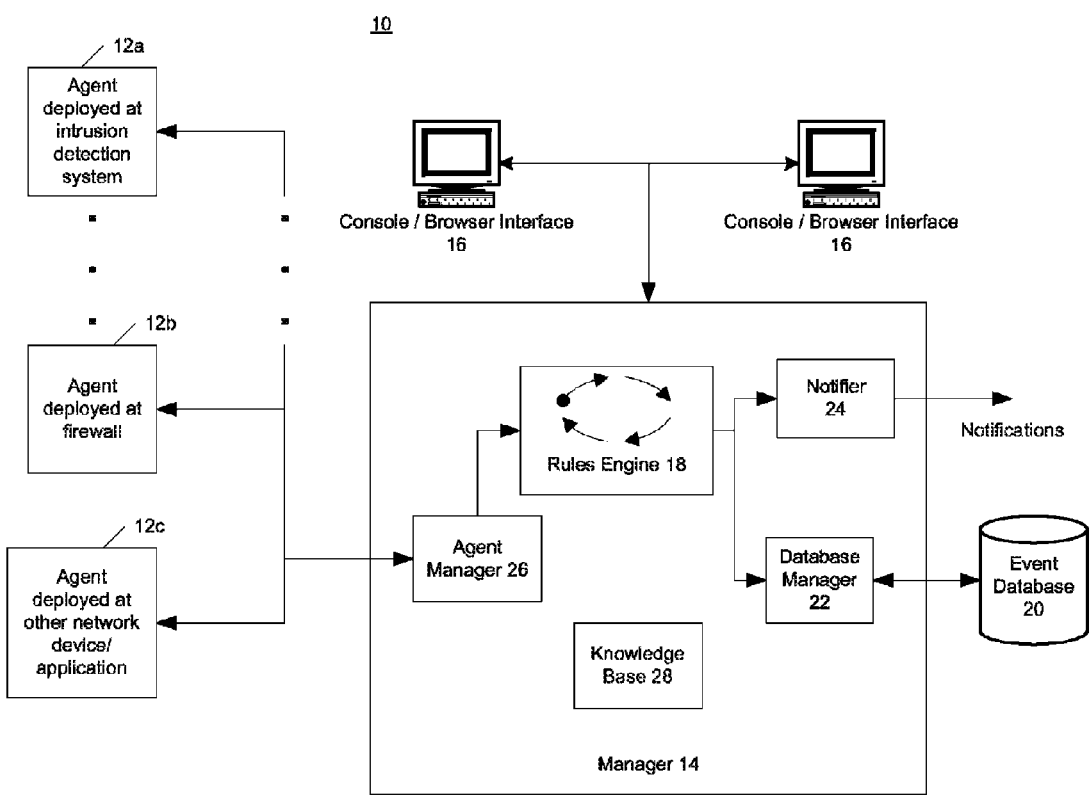
FIG. 1 illustrates one embodiment of a computer-based system for capturing, normalizing and reporting security events from heterogeneous sources configured in accordance with the present invention.

Described herein is a computer-based system that allows for replaying security events captured from heterogeneous sources, in order to provide a historical view of the event traffic. If so desired, the events may be cross-correlated according to rules in order to generate meta-events. The rules used during replay may be different from rules used at a time when the event data was being analyzed "live" (i.e., at a time when the event data was captured from the sources). Thus, the replay mechanism provides a means for testing different correlation rules and comparing the results thereof before utilizing new rules on live event data streams.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a computer-based system 10 architected accordance with an embodiment of the present invention is illustrated. System 10 includes agents 12, one or more managers 14 and one or more consoles 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12 are software programs that provide efficient, real-time (or near real-time) local event data capture and filtering from a variety of network security devices and/or applications. The primary sources of security events are common network elements including firewalls, intrusion detection systems and operating system logs. Agents 12 can collect events from any source that produces event logs or messages and can operate at the native device, at consolidation points within the network, and/or through simple network management protocol (SNMP) traps.

Agents 12 are configurable through both manual and automated processes and via associated configuration files. Each agent 12 may include one or more software modules including a normalizing component, a time correction component, an aggregation component, a batching component, a resolver component, a transport component, and/or additional components. These components may be activated and/or deactivated through appropriate commands in the configuration file.

Managers 14 are server-based components that further consolidate filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through one or more notifiers 24), and reporting, as well as a knowledge base 28 and case management workflow. The manager 14 may be deployed on any computer hardware platform and one embodiment utilizes a relational database management system such as an Oracle™ database to implement the event data store component. Communications between manager 14 and agents 12 may be bi-directional to allow manager 14 to transmit commands to the platforms hosting agents 12) and encrypted. In some installations, managers 14 may act as concentrators for multiple agents 12 and can forward information to other managers (e.g., deployed at a corporate headquarters).

Consoles 16 are computer—(e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Examining each of the various components in further detail, we begin with the agents 12. Agents 12 are used to collect, reduce, and normalize the enormous amount of data that is generated by a network's security devices before a manager 14 acts on the data. Data normalization is of great benefit when an analyst must deal with security incidents in a heterogeneous network environment because alerts can come from routers, e-mail togs, anti-virus products, firewalls, intrusion detection systems, access control servers, VPN systems, NT Event Logs, Syslogs, and other sources and it is seldom, if ever, the case that two manufactures will use the same event logging mechanism or format their event log's) identically.

Thus, agents 12 receive the event information from the associated network devices or applications in the devices' or applications' native formats and convert (or normalize) the information to a common schema. To accomplish this normalization, agents 12 are equipped with a parser configured to extract values from the events as reported by the individual network devices/applications and populate the corresponding fields in the normalized schema. Normalizing event data may be done by fields or field values, based on conventions and practices of the organization. For example, the variety of event severity levels that devices produce can all be normalized at the agent level into a single, consistent hierarchy.

In some embodiments, each event generator has an agent 12 assigned collect all relevant security information, while in other embodiments agents are shared among two or more event generators. Thus, depending on the device/application to be monitored and the in-place infrastructure, a choice is provided for simple log parsing and loading, network listening (e.g., through SNMP traps), installation on aggregation points (Syslog servers and concentrators) and full distribution to all security-relevant devices. Following normalization, the event data is transmitted to the manager 14. In some embodiments the event data is discarded after successful transmission to the manager 14, but in other cases the data may be cached for a time at the agent 12 to permit later replay of the data. Caching may be done by storing the event data on computer-readable media associated with the agents and/or their host network devices.

The manager 14 includes one or more agent managers 26, which are responsible for receiving the event data transmitted by the agents 12. Where bi-directional communication with the agents 12 is implemented, these agent managers 26 may be used to transmit messages to the agents 12. If encryption is employed for agent—manager communications (which is optional), the agent manager 26 is responsible for decrypting the messages received from agents 12 and encrypting any messages transmitted to the agents 12.

Once the event data has been received (and if necessary decrypted), the event data is passed to the rules engine. Rules engine 18 is at the heart of the manager 14 and is used to cross-correlate the event data according to security rules in order to generate meta-events. Meta-events, in the context of the present invention, are instances of (usually) multiple individual event data elements (gathered from heterogeneous sources) that collectively satisfy one or more rule conditions such that an action is triggered. Stated differently, the meta-events represent information gathered from different sensors and presented as correlated results the decision output of the rules engine 18 indicating that different events from different sources are associated with a common incident as defined by one or more rules).

The actions triggered by the rules may include notifications transmitted (e.g., via notifier 24) to designated destinations (e.g., security analysts may be notified via the consoles 16, e-mail messages, a call to a telephone, cellular telephone, voicemail box and/or pager number or address, or by way of a message to another communication device and/or address such as a facsimile machine, etc.) and/or instructions to network devices (e.g., via agents 12 or via external scripts or programs to which the notifier 24 may pass arguments) to take action to thwart a suspected attack (e.g., by reconfiguring one or more of the network devices, and/or modifying or updating access lists, etc.). The information sent with the notification can be configured to include the most relevant data based on the event that occurred and the requirements of the analyst.

As part of the process of generating meta-events, rules engine 18 examines the received events to determine which (if any) of the various rules being processed in the system may be implicated by a particular event or events. A rule is considered to be implicated if an event under test has one or more attributes that sat is, or potentially could satisfy, one or more rules. For example, a rule can be considered implicated if the event under test has a particular source address from a particular subnet that meets conditions of the rule. Events may remain of interest in this sense only for designated time intervals associated with the rules and so by knowing these time windows the rules engine 18 can store and discard events as warranted. Any interesting events may be grouped together and subjected to further processing by the rules engine 18.

As discussed below, when meta-events are generated by the rules engine 18, on-screen notifications may be provided to consoles 16 to prompt users to open cases for investigation of the events which led to the notification. This may include accessing knowledge base 28 to gather information regarding similar attack profiles and/or to take action in accordance with specified procedures. The knowledge base 28 contains reference documents (e.g., in the form of web pages and/or downloadable documents) that provide a description of the threat, recommended solutions, reference information, company procedures and/or links to additional resources. Indeed, any information can be provided through the knowledge base 28. By way of example, these pages/documents can have as their source: user-authored articles, third-party articles, and/or security vendors' reference material.

In one embodiment, the rules engine 18 is based on a RETE engine configured to preserve even formation state over configurable time windows so as to provide correlation of the event data according to specified rules. Correlation is generally regarded as a process of bringing information items into mutual relation. In the context of the present invention, correlation through rules engine 18 provides the ability to access, analyze, and relate different attributes of events from multiple sources to bring something to the attention of an analyst that might (or likely would) have otherwise gone unnoticed. In other words, the rules engine 18 provides the ability to determine what type of incident is represented by a collection of events reported by a number of heterogeneous network devices and/or applications. Because the collected event data is normalized into a common event schema, correlation can be performed utilizing any field including, but not limited to, geography, device type, source, target, time thresholds, and/or event type. Based on alerts generated by the rules engine 18, operators are provided with a workflow for investigating these incidents.

Figure 2:
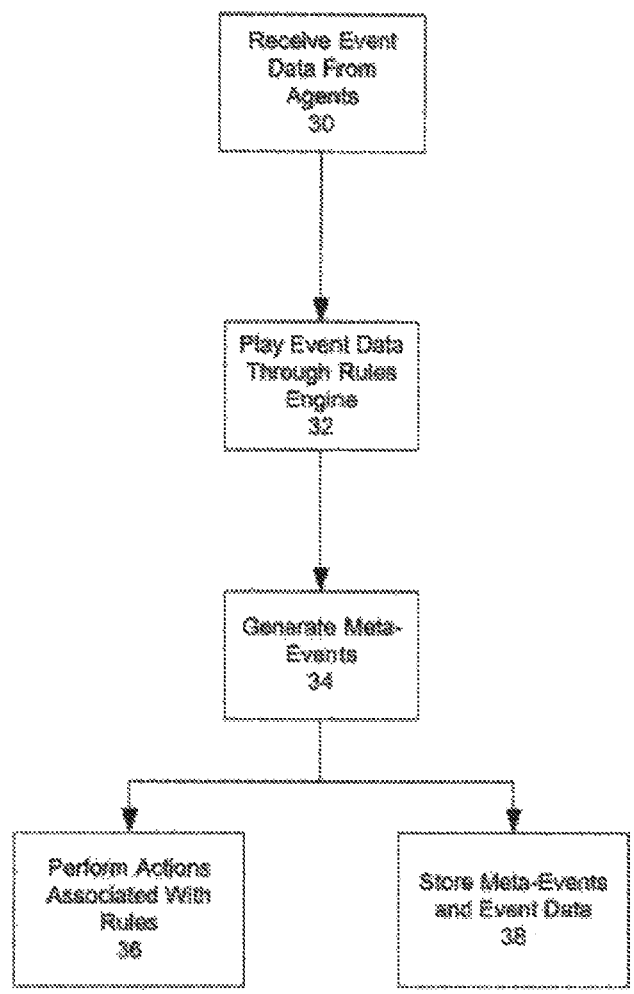
FIG. 2 illustrates procedures followed by a manager configured in accordance with an embodiment of the present invention when analyzing security event data and generating alerts based thereon.

Turning to FIG. 2, the manager 14 receives (step 30) and analyzes (step 32) the event data reported by agents 12 in real-time (or near real-time according to a set of flexible rules. The rules define which events generate an alert, when those events generate an alert, and what actions are associated with the alert. Hence, the rules may be written to contain event conditions, thresholds, and actions. In some cases, related meta-events may be grouped together to determine if a threshold of a time-based rule is reached. For example, time-based rules can require that an event occur ten times in an hour to signify that an action needs be performed. If that threshold is not reached, the group of meta-events is discarded. If the threshold is reached, however, then a second stage meta-event may be generated and an action based thereon initiated. Higher level meta-events (such as third stage meta-events and so on) may also be generated.

In some embodiments the rule conditions may be specified using Boolean operators and/or database queries. When incoming events match a particular rule's conditions and thresholds, causing a meta-event to be generated (step 34), the rule automatically fires the action that has been defined (step 36). Such actions can include, but are not limited to: executing a pre-determined command or script, logging the alert, sending the alert, to the consoles 16, sending the alert, to notification designees, setting custom severity levels for the alert based on cumulative activity, adding a source to a suspicious list or a target to a vulnerable list, and/or a combination of these actions.

Rules may be created at the manager 14 and/or at the consoles 16 using a flexible scripting language. An example of a rule might be:

If (an ids evasion attack) occurs (from the same source ip address) (3 times) within (2 minutes) then (send message to console) and (notify the security supervisor via pager).

In this example, the incoming event data would be compared against the rule conditions and thresholds (in the above example 3 events that satisfy the condition of an IDS evasion attack are required and all must originate from a common source IP address and be detected within 2 minutes of each other), and if those criteria are satisfied the designated actions (here, sending an alert message to the consoles 16 and also notifying a security supervisor via a pager) would be performed. The correlation rules that operate on the events evaluate threats and attacks according to selected criteria (e.g., degree of threat, level of success, vulnerability of target and value of target) and generate alerts according to a security intelligence taxonomy that focuses attention on the most dangerous and potentially most damaging attacks. For example, threats to network assets that are deemed not to have succeeded or that are not likely to succeed may be coded green, while those that have succeeded or have a high probability of success might be coded red. The value of the security information taxonomy lies in its ability to eliminate false positives while clearly identifying real threats to vulnerable and valuable assets.

In general, the rules may be designed to capture threats and attacks that are typical in large, diverse networks and may be organized to provide multiple lines of defense by detecting specific activities and grouping them according to level of threat such as:

Reconnaissance zone transfer, port scan, protocol, scanning, etc.

Suspicious illegal outgoing traffic, unusual levels of alerts from the same host, etc.

Attack overflow, IDS evasion, virus, denial of service, etc.

Successful compromise of a backdoor, root compromise, covert channel exploit, etc.

Similar events and signatures may be grouped into rule categories that can be utilized by the rules to insulate the rule from changes in vendor-specific event details. For example, event names may change between product releases or new devices may be added to the network infrastructure with a new set of nomenclature. Since the rule categories map similar signatures into a single name that is used by the rules engine, if an individual network device changes taxonomy, only the mapping is changed, not the rule definition. Therefore, despite changes in individual devices, the investment in custom defined rules is preserved.

After the events are processed by rules engine 18, the raw event data as well as any meta-events that were generated are stored in database 20 (step 38). In some embodiments, the raw event data may be stored prior to or concurrently with processing of the data by rules engine 18. Regardless of the sequence, such storage of the event data (and the meta-events generated by the rules engine 18) preserves a historical record of the event traffic and allows for replaying of the events through an existing or a new rule set (either at the manager 14 or the consoles 16) in order to assess the efficacy of new rules, for training purposes, and/or for case investigation.

Correlation via the rules ensures that credible threats and attacks come to the attention of the security station a highpriority basis. Hence once an alert is received, the operator can perform in-depth analysis and take aggressive action secure in the knowledge that the effort is well spent. When a rule match is reported to a console 16, the analyst can quickly drill down (through an associated graphical user interface) to see all of the individual events that caused the rule to fire. If necessary, the analyst can investigate even further to see all of the individual data elements captured for those events.

The console 16 provides a centralized view into the security status of an enterprise and gives administrators, analysts, and operators an interface to perform security management tasks. This view is provided through a graphical user interface (GUI) that can be run in Windows™, Linux™, Apple™, Palm™ or similar operating environments. Furthermore, console 16 can be executed as an independent software application in the aforementioned operating environments or also be web enabled via, a web browser such as Internet Explorer™ or Netscape Navigator™. In various embodiments, the console's GUI provides event display in real-time or replay mode (i.e., the ability to playback events from a given time period according to a VCR or DVD metaphor). Replay may be had from the events stored in database 20 or, in some instances, from caches associated with agents 12. This latter form of replay is especially useful because it provides improved simulation of actual network conditions as the events are played out across the same network as during the original attack.

One embodiment of the GUI for console 16 includes five configurable areas of interest: a toolbar area that contains a file menu area as well as the event playback controls; a navigation panel that allows a user to view system assets (as well as dashboards) in an organized manner; an inspect/edit panel through which a user can examine a specific event in great detail; a views panel that allows a user to view security events from heterogeneous sources; and a status bar that describes the current state of the time-based events selected by a user. All areas of this GUI are user configurable and customizable. For example, rather than providing a list of events in response to a query, playback controls allow a user to simulate the events as they occurred in time. The events may be played back over a user specified time period with a specified speed factor. The speed factor is set by the user to either speed up or slow down playback as compared to real time. The playback controls also provide a graphical display of the volume and severity (or other attributes) of the events, allowing users to be apprised of such matters at a glance.

Once security personnel have been notified of a meta-event, they can utilize the knowledge base to determine the appropriate actions. In addition, security analysts may undertake investigations of events and/or meta-events. In general, such matters can be assigned to so-called cases. Stated differently, cases create a workflow and oversight environment for situations where there are suspicious events requiring further investigation. Once a case is created, it can be assigned to an operator, investigated, and resolved based on the business policies and practices of the enterprise (e.g., as documented in knowledge base 28). The security staff can also add narration and event information to a case, or view open cases to determine their status and any required next steps.

Consoles 16 also provide a front-end for the administration of the entire system 10. This may include system configuration such as setting up operators, notification, agent behavior, etc. User management (such as creating and modifying users, access, roles, and responsibilities), rules management (e.g., authoring, viewing, and updating rules), and workflow management (e.g., setting up the flow of actions taken when an events received) may also be handled through the consoles 16. Finally, the consoles 16 allow for remote access, thus supporting divisional responsibility and "follow-the-sun" management.

Figure 3:
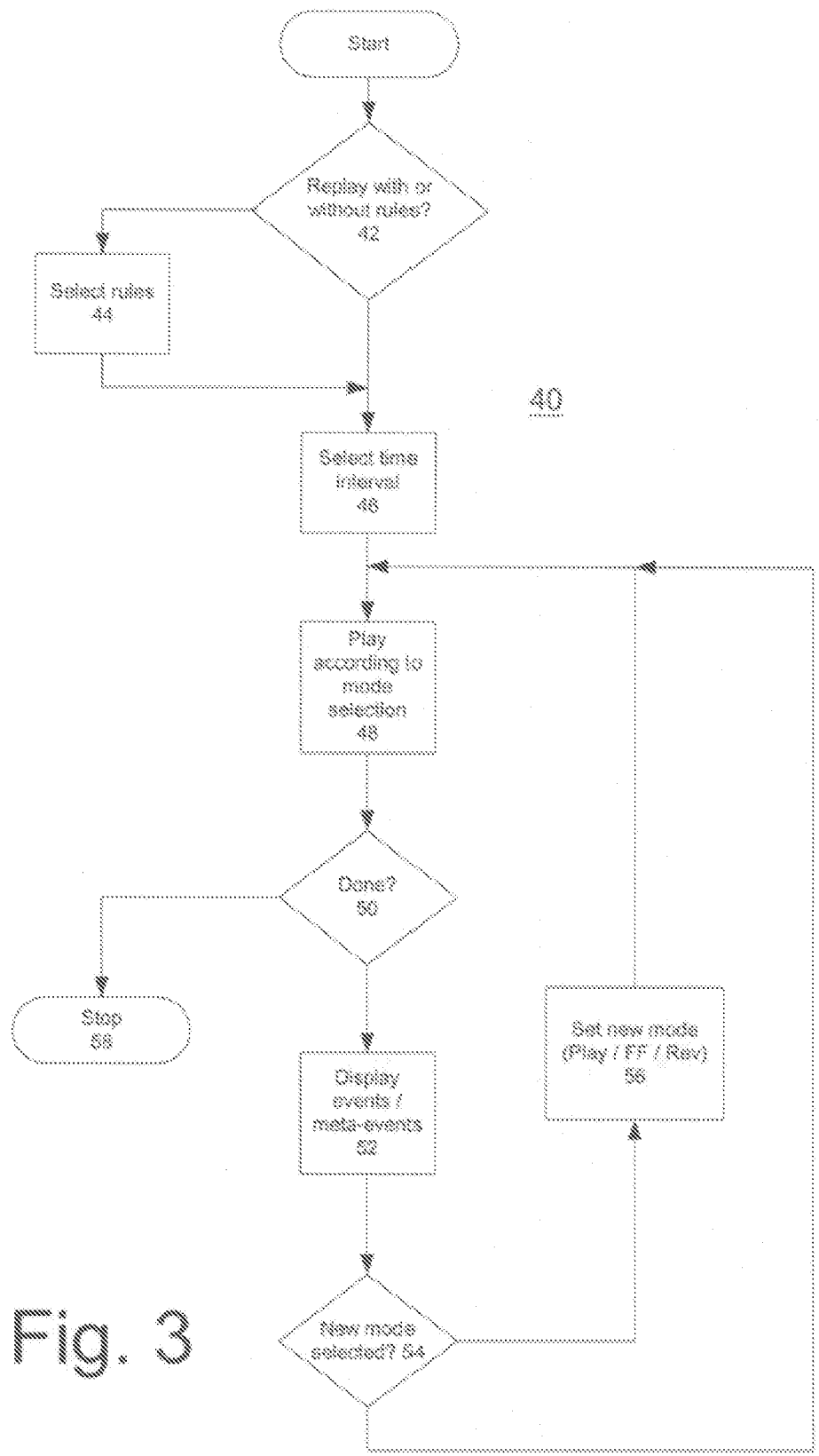
FIG. 3 illustrates a process for replaying security events in accordance with an embodiment of the present invention.

Turning now to FIG. 3, an example of a replay process 40 configured in accordance with one embodiment of the present invention is provided. Replay of event information may be had from a computer readable storage device such as database 20 and in response to user selection via consoles 16. The replay may be performed with or without the correlation rules (steps 42 and 44) and the rules, if selected, may be those that were used at the time the event data was played live or a new set of rules entirely.

In either case, a time interval of previously stored security events is selected (step 46) and the stored security events are replayed according to a selected mode of playback (step 48). Playback can be performed and the events displayed in any of several modes. One mode allows for "normal time" (or PLAY) in which the replay is performed as if the security events were playing out in real time. Alternatively, the replay can be accelerated to play faster than normal (FAST FORWARD), for a quick review of the events, or even to play "instantaneously", if one only wants to review the results of correlation operations. A REVIEW (or REWIND) mode is also available, as is a PAUSE. The mode selection may be made through a graphical computer interface at the console 16 through the use of virtual buttons defining the modes of replay, such as "play", "fast forward" and "reverse", etc. This provides a VCR or DVD metaphor familiar to many users. The time interval selection may be made through the graphical user interface, for example using a pick list and/or by selecting a time window of security events for replay.

During replay, the events are played out step 50) until the time events that make up the selected time window are exhausted (step 58). During this time, the events and/or the meta-events generated thereby may be displayed at one or more consoles 16 and/or manager 14 (step 52). Playback mode may be altered (step 54) in order to accommodate the analysis being undertaken. Thus, a user may play, fast forward and/or rewind through the event data, all the while employing new or different rules in order to test the efficacy of such rules against the historical data.

Thus, during replay, the previously stored security events may be cross-correlated according to rules defining security incidents. Meta-events are generated when the security events satisfy conditions associated with one or more of the rules. In some cases, the rules used during replay differ from prior rules used at a time when the security events occurred within a computer network that included the computer network devices. In this way, new rules can be tested against true security event data streams to determine whether or not the rules should be used in a live environment.

When generated, the meta-events can be displayed at the consoles 16. In some embodiments, even previously generated meta-events (i.e., those that were generated at a time the security events actually occurred within the computer network) can be displayed. For example, such previously generated meta-events can be replayed from the same (or a different) computer readable storage device.

Thus, a computer-based system for replaying previously stored security events from heterogeneous sources has been described. In the foregoing description, the various examples and embodiments were meant to be illustrative of the present invention and not restrictive in terms of their scope. Accordingly, the invention should be measured only in terms of the claims, which follow.

The invention claimed is:

1. A method, comprising:
a first device, including a first hardware processor, receiving events, wherein one or more of the events originated in an event log that was generated by a computer network device;
the first device normalizing the events to a common event schema;
the first device transmitting the normalized events to a second device including a second hardware processor;
the second device receiving the normalized events and correlating the normalized events according to a first rule;
the first device storing the normalized events to a computer-readable storage device;
the first device retrieving one or more of the normalized events from the computer-readable storage device;
the first device transmitting the retrieved normalized events to the second device; and
the second device receiving the retrieved normalized events and correlating the retrieved normalized events according to a second rule, wherein the second rule differs from the first rule,
wherein the second rule is applied to live events reported by one or more computer network devices.

2. The method of claim 1, further comprising displaying a meta-event.

3. The method of claim 2, wherein the meta-event represents an instance for which various ones or more of the retrieved normalized events satisfy a condition associated with the second rule.

4. The method of claim 1, wherein prior to being normalized, one or more of the events was gathered from one or more of routers, e-mail logs, anti-virus products, firewalls, network intrusion detection systems, access control servers, virtual private network systems, network device event logs, and network device Syslogs.

5. The method of claim 1, wherein the first device stores a software agent that is associated with the computer network device.

6. The method of claim 1, wherein the first device transmits the retrieved normalized events in response to user selection.

7. The method of claim 6, wherein the user selection is made through a graphical user interface having elements defining modes of re-transmission.

8. The method of claim 7, wherein the modes of re-transmission include "play", "fast forward" and "reverse".

9. The method of claim 6, wherein the user selection indicates a time interval.

10. The method of claim 1, wherein the transmission of the retrieved normalized events to the second device is performed faster than the initial transmission of the normalized events to the second device.

11. A system, comprising:
a first device comprising a first hardware processor configured to:
receive events, wherein one or more of the events originated in an event log that was generated by a computer network device;
normalize the events to a common event schema;
transmit the normalized events to a second device;
store the normalized events to a computer-readable storage device;
retrieve one or more of the normalized events from the computer-readable storage device; and
transmit the retrieved normalized events to the second device; and
the second device comprising a second hardware processor configured to:
receive the normalized events and correlate the normalized events according to a first rule; and
receive the retrieved normalized events and correlate the retrieved normalized events according to a second rule, wherein the second rule differs from the first rule,
wherein the second rule is applied to live events reported by one or more computer network devices.

12. The system of claim 11, wherein the second hardware processor of the second device is further configured to display a meta-event.

13. The system of claim 12, wherein the meta-event represents an instance for which various ones or more of the retrieved normalized events satisfy a condition associated with the second rule.

14. The system of claim 11, wherein prior to being normalized, one or more of the events was gathered from one or more of routers, e-mail logs, anti-virus products, firewalls, network intrusion detection systems, access control servers, virtual private network systems, network device event logs, and network device Syslogs.

15. The system of claim 11, wherein the first device stores a software agent that is associated with the computer network device.

16. The system of claim 11, wherein the hardware processor of the first device is further configured to transmit the retrieved normalized events in response to user selection.

17. The system of claim 16, wherein the user selection is made through a graphical user interface having elements defining modes of re-transmission.

18. The system of claim 17, wherein the modes of re-transmission include "play", "fast forward" and "reverse".

19. The system of claim 16, wherein the user selection indicates a time interval.

20. The system of claim 11, wherein the transmission of the retrieved normalized events to the second device is performed faster than the initial transmission of the normalized events to the second device.

* * * * *